(12) United States Patent
Taylor et al.

(10) Patent No.: US 9,174,616 B2
(45) Date of Patent: Nov. 3, 2015

(54) ELECTRONIC BRAKE SYSTEM LINE LOCK FEATURE

(71) Applicant: Continental Automotive Systems, Inc., Auburn Hills, MI (US)

(72) Inventors: Seth Michael Taylor, Lapeer, MI (US); Clinton Schumann, Royal Oak, MI (US); Andrew Knepper, Royal Oak, MI (US); Kurt Myers Branson, Waterford, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 47 days.

(21) Appl. No.: 13/998,526

(22) Filed: Nov. 7, 2013

(65) Prior Publication Data

US 2014/0129107 A1  May 8, 2014

Related U.S. Application Data

(60) Provisional application No. 61/723,539, filed on Nov. 7, 2012.

(51) Int. Cl.
*B60T 8/26* (2006.01)
*B60T 13/66* (2006.01)
*B60T 8/172* (2006.01)
*B60T 8/175* (2006.01)
*B60T 7/12* (2006.01)
*B60T 8/1755* (2006.01)

(52) U.S. Cl.
CPC . *B60T 8/26* (2013.01); *B60T 8/172* (2013.01); *B60T 8/175* (2013.01); *B60T 13/662* (2013.01); *B60T 7/12* (2013.01); *B60T 8/17555* (2013.01); *B60T 2270/89* (2013.01)

(58) Field of Classification Search
CPC ............. B60T 8/00; B60T 8/17; B60T 8/172; B60T 8/175; B60T 8/26; B60T 8/3205; B60T 8/321; B60T 2201/14; B60T 2270/89
See application file for complete search history.

(56) References Cited

U.S. PATENT DOCUMENTS

| | | | |
|---|---|---|---|
| 5,954,406 A | 9/1999 | Sawada | |
| 6,406,103 B1* | 6/2002 | Elliott et al. | 303/20 |
| 7,878,053 B2 | 2/2011 | Lehner et al. | |
| 8,155,821 B2 | 4/2012 | Schubert et al. | |
| 2007/0096557 A1* | 5/2007 | Tamai et al. | 303/191 |
| 2011/0175438 A1* | 7/2011 | Mlynarczyk et al. | 701/70 |
| 2011/0175439 A1* | 7/2011 | Mlynarczyk et al. | 701/70 |

FOREIGN PATENT DOCUMENTS

| | | |
|---|---|---|
| DE | 69731248 T2 | 3/2006 |
| DE | 102007003741 A1 | 11/2007 |
| DE | 102007061123 A1 | 9/2008 |
| DE | 102011053516 A1 | 3/2013 |

* cited by examiner

*Primary Examiner* — Tuan C. To
*Assistant Examiner* — Dale W Hilgendorf

(57) ABSTRACT

A method applying a line lock feature, i.e. a wheel hold mode, with a brake system for a vehicle comprises initiating a wheel hold mode for the brake system and applying pressure to the wheels of a non-driven axle. The wheel brake pressure is maintained at the wheels of the non-driven axle independent of application of the brake pedal. The wheel brake pressure at the wheels of the non-driven axle is released when a release trigger event occurs. The release trigger event may be an automatic trigger event or a driver actuated trigger event.

18 Claims, 2 Drawing Sheets

ELECTRONIC BRAKE SYSTEM LINE LOCK FEATURE

PRIORITY

This application is a non-provisional of, and claims priority to the Nov. 7, 2012, filing date of, U.S. provisional patent application Ser. No. 61/723,539, the entire content of which is incorporated herein by reference.

TECHNICAL FIELD

The present disclosure relates to automotive vehicles and more particularly to electronic brake systems for automotive vehicles.

BACKGROUND

The present invention relates to an electronically controlled hydraulic brake system. Maintaining optimal performance for vehicle brake systems is important. For example, in some situations it is desirable for a driver of the vehicle to provide conditioning of the tire, such as increasing a surface temperature of the tire prior to driving. Also, in a competition drag racing environment, a driver is required to position the car at the starting line and maintain that position until the signal to accelerate is given. Failure to do so results in disqualification. In such situations of tire conditioning, it is desirable to hold some tires of the vehicle from moving to maintain the vehicle position, while allowing other tires to freely rotate and, thus, increase the surface temperature of the tire.

Vehicles equipped with manual transmissions require the driver to operate the throttle, brake, and clutch pedal simultaneously in order to achieve optimum tire-conditioning. The driver's left foot must manage clutch engagement while their right foot is forced to engage both the throttle to manage engine speed and the brake pedal to prevent the vehicle from moving. To assist a driver in such conditions mechanical and electro-mechanical valves and solenoids are installed on the vehicles to override the braking system and to assist the driver to maintain brake pressure at the appropriate wheels.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method applying a line lock feature, i.e. a wheel hold mode, with a brake system for a vehicle comprises initiating a wheel hold mode for the brake system and applying pressure to the wheels of a non-driven axle. The wheel brake pressure is maintained at the wheels of the non-driven axle independent of application of the brake pedal. The wheel brake pressure at the wheels of the non-driven axle is released when a release trigger event occurs. The release trigger event may be an automatic trigger event or a driver actuated trigger event.

A brake system comprises a master cylinder, a plurality of wheel brakes connected to the master cylinder to apply a brake pressure at each of a plurality of vehicle wheels, and an electronic control unit connected to the master cylinder to control pressure within the brake system. The electronic control unit includes instructions for: initiating a wheel hold mode for the brake system; applying pressure to the wheels of a non-driven axle; maintaining wheel brake pressure at the wheels of the non-driven axle independent of application of the brake pedal; and releasing the wheel brake pressure at the wheels of the non-driven axle a release trigger event occurs. The release trigger event may be an automatic trigger event or a driver actuated trigger event.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
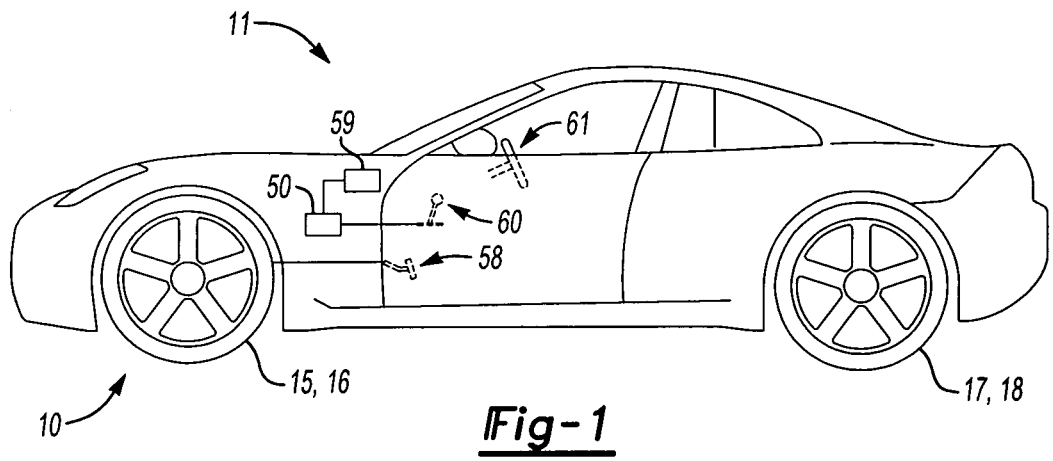
FIG. 1 is a schematic illustration of a vehicle having a hydraulic brake system of the present invention.
Figure 2:
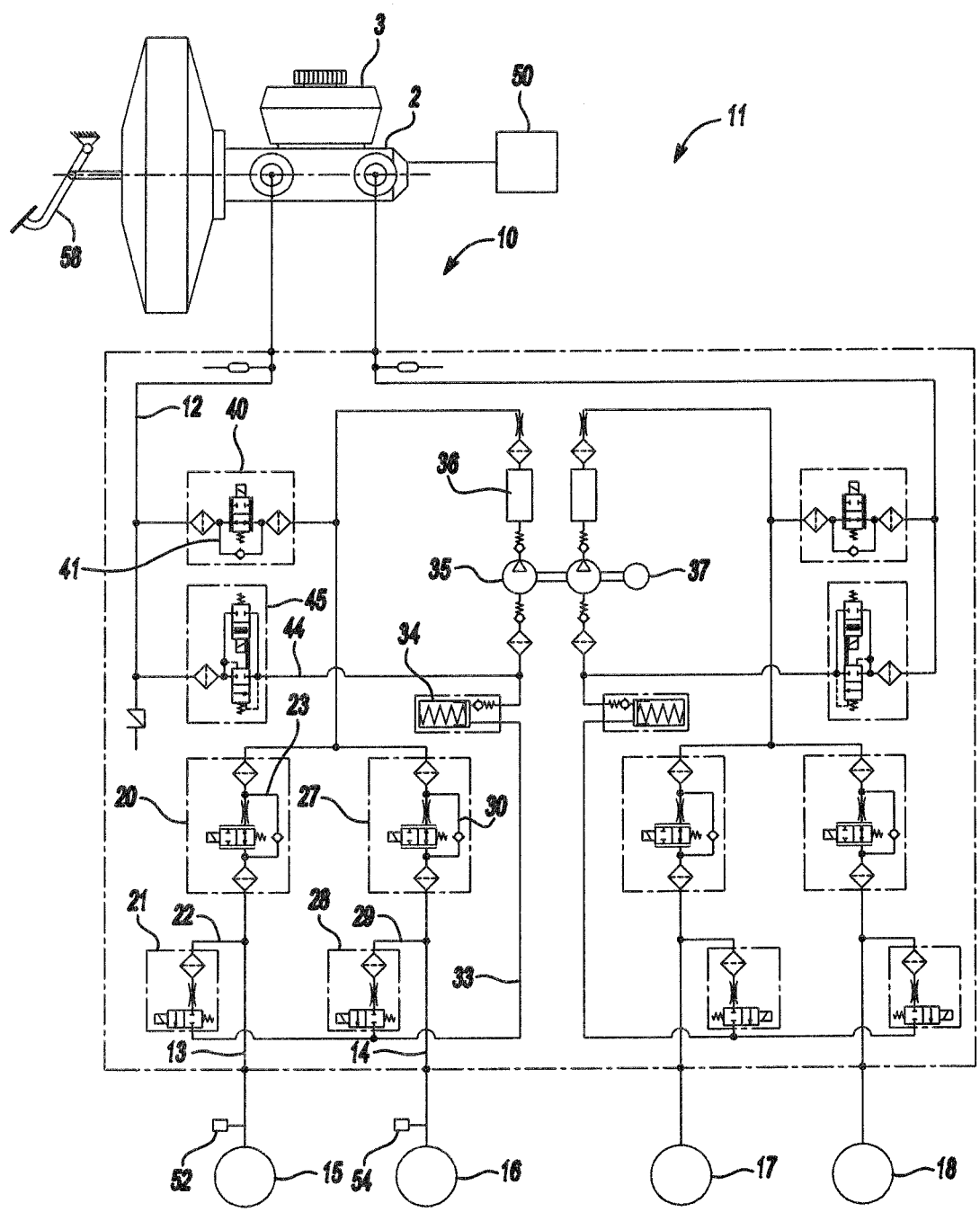
FIG. 2 is a schematic illustration of the hydraulic brake system of FIG. 1.

The following description is merely exemplary in nature and is in no way intended to limit the disclosure, its application, or uses. For purposes of clarity, the same reference numbers will be used in the drawings to identify similar elements. FIGS. 1 and 2 show a hydraulic dual-circuit brake system 10 for a motor vehicle 11 capable of performing anti-lock brake control as well as active interventions for traction control, electronic stability control (ESC), active rollover protection (ARP), and the like. The brake system 10 has a pedal-actuated tandem master brake cylinder 2 with a brake fluid reservoir 3. Both brake circuits of the shown brake system 10 have the same set-up.

The brake line 12 begins at the master brake cylinder 2 and splits into two inlet lines 13 and 14. Inlet line 13 leads to a wheel brake 15 and inlet line 14 leads to a wheel brake 16.

A valve assembly that comprises an inlet valve 20 disposed in the inlet line 13 and an outlet valve 21 that is located in a return line 22 is associated with the wheel brake 15. The inlet valve 20 has a spring-actuated open position and an electromagnetically switchable blocking position. The outlet valve 21 has a spring-actuated blocking position and an electromagnetically switchable open position. A one-way valve 23 is disposed in the inlet line 13 parallel to the inlet valve 20. The two-position valves 20 and 21 of the valve assembly also serve the purpose of brake pressure modulation; in switching positions and, a brake pressure build-up is possible in the wheel brake 15, while in the switching positions and, pressure holding and in switching positions and pressure reduction in wheel brake 15 are possible.

Another valve assembly is likewise associated with the wheel brake 16 and similar to the valve assembly associated with wheel brake 15 comprises an inlet valve 27 in the inlet line 14 and an outlet valve 28 in a return line 29. A one-way valve 30 is connected parallel to the inlet valve 27 in the inlet line 14. The two-position valves 27 and 28 of the valve assembly 26 again have the purpose of modulating the pressure in the wheel brake 16.

The return lines 22 and 29 originating at the inlet lines 13 and 14 between the two-position valves 20 and 27 and the wheel brakes 15 and 16 are united in a return line 33 that is connected to the brake line 12. A low-pressure accumulator 34 communicates with the return line 33. Essentially disposed downstream of the low-pressure accumulator 34 in the return line 33 are a pump 35, a damper chamber 36 and a throttle. The pump 35 is a self-priming pump.

A shut-off valve 40 with a parallel-connected one-way bypass valve 41 is disposed in the brake line 12 between the master brake cylinder 2 and the connection of the return line 33. The shut-off valve 40 has a spring-actuated open position and an electromagnetically switchable blocking position. In its blocking position, the shut-off valve 40 includes a pressure limiting function, which prevents excessive pressure build-up in the brake line below the shut-off valve 40.

A bypass line 44 begins at the brake line 12 between the master brake cylinder 2 and the shut-off valve 40. Disposed in the bypass line 44 is a switch-over valve 45 having one spring-actuated closed position and one electromagnetically switchable open position. The bypass line 44 is connected to the return line 33 between the inlet side of the self-priming pump 35 and the low-pressure accumulator 34.

The brake system 10 includes an electronic control unit (ECU) 50, which can evaluate signals from various sensors 52, 54 that monitor the rotational behavior of the vehicle 11, e.g. wheel speed sensors. The ECU 50 controls the pump 35 and valves 20, 21, 27, 28, 40, 45 in accordance with a situation-specific control algorithm and, in the event that the demands of two control algorithms are in conflict with each other, arbitrates the demands to find a compromise or to give priority to one of them over the other. The brake system shown 10 is capable of performing active brake interventions, i.e. of building up brake pressure independent of the driver's operation of the brake pedal.

The ECU 50 is connected to the master brake cylinder 2, the pump 35, and valves 20, 21, 27, 28, 40, 45 to control pressure within the brake system 10. The brake system 10 provides a line lock feature, i.e. a wheel hold mode 56. The line lock feature/wheel hold mode 56 includes the ECU 50 providing instructions to the EBS 10 for: holding wheel brake pressure at the wheels 15 and 16 of a non-driven axle when a driver of the vehicle 11 selects using a wheel hold mode 56 for the brake system 10 and initiates the wheel hold. The wheel brake pressure is released at the wheels 15 and 16 of the non-driven axle when the vehicle 11 by driver actuations or a predetermined event(s). The driven wheels 17 and 18 are bypassed allowing them to rotate freely while the non-driven wheels 15 and 16 continue to have brake pressure applied to hold the vehicle 11 in place.

Figure 3:
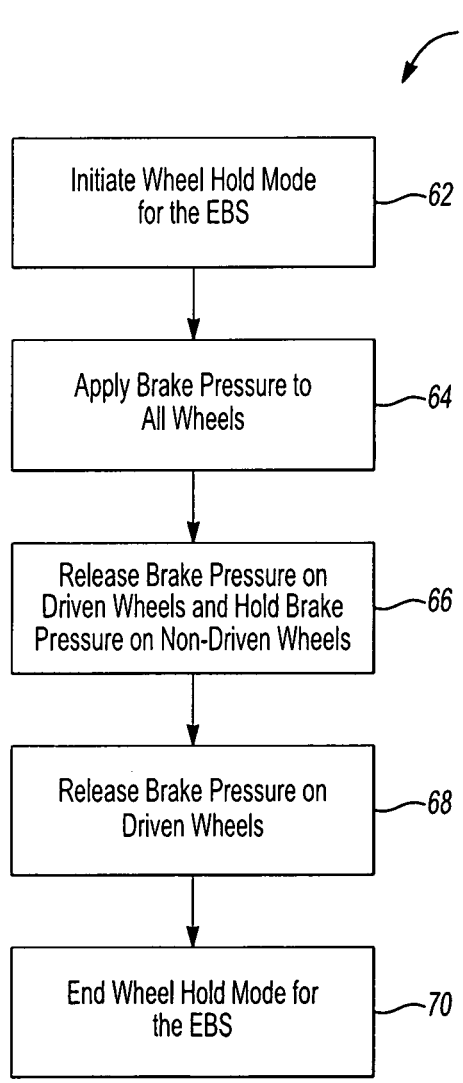
FIG. 3 is a schematic illustration of a method for applying a line lock feature/wheel hold mode on the hydraulic brake system of FIGS. 1 and 2.

Referring to FIGS. 1 and 3 a method of operating a brake system 10 comprises the driver initiating a wheel hold mode 56, step 62. Pressure is applied at the wheels 15 and 16 of the non-driven axle, or at all wheels 15-18, step 64. If needed the brake system 10 releases brake pressure at the wheels 17 and 18 on the driven axle, step 66. The pressure at the non-driven wheels 15 and 16 is released by a trigger event, step 68. The brake system 10 ends the wheel hold mode 56 once the wheel brake pressure on the wheels 15 and 16 has been released, step 70.

The wheel hold mode 56 may be selected by a mechanical or electrically operated activation switch 59, step 62. For example the activation switch 59 may be a mechanical switch located on the dash or an electrical switch on a heads-up display, a navigation system, or other HMI interface.

The ECU 50 may perform one or more system checks when the driver requests the wheel hold mode 50 and prior to initiating the wheel hold mode 56. The system checks may be used to determine if the driver and/or the vehicle are prepared to operate in wheel hold mode 56. The system checks may include, but are not limited to: vehicle speed below an initiation threshold, confirmation no faults are currently existing within the EBS 10, steering wheel angle/offset below a threshold/position confirmed, drive mode of the vehicle (the line lock feature may only be available when the vehicle is not in certain operating modes, such as those associated with wet or low friction conditions), other active brake system functions are not currently engaged (e.g hill start assist), confirmation that the vehicle is running, confirmation that the doors are closed, confirmation that the driver seat belt is engaged. The system checks performed by the ECU 50 may vary for a particular vehicle 10. One skilled in the art would be able to determine the system checks which should be applied for a particular vehicle 10 having the line lock feature/wheel hold mode 56. If at least one of the system checks are not met the wheel hold mode 56 is not initiated. In addition, the driver may be provided with a message that the vehicle is not prepared for entering wheel hold mode 50. The message may include indication of which system conditions are not satisfied. If all of the system checks are satisfied the ECU 50 may initiate the wheel hold mode 56.

Once the line lock feature/wheel hold mode 56 is activated other functions of the EBS 10 may not be available until the vehicle exits the wheel hold mode 56. EBS 10 features such as traction control, and anti-lock braking would directly interfere with the line lock feature/wheel hold mode 56 and are, thus, deactivated. As soon as the vehicle 11 exits wheel hold mode 56 these features would then be reactivated.

Brake pressure may be applied to the wheels 15 and 16 or all wheels 15-18, step 64. Alternatively, the ABS pump 35 may be used to build pressure at the wheels 15 and 16. Applying brake pressure may be initiated by the driver depressing the brake pedal 58, or may be triggered by the ECU 50 when the wheel hold mode 56 is initiated. If the wheel brake pressure is applied at all the wheels 15-18 initially the brake pressure at the driven wheels 17 and 18 may be released, e.g. when the driver releases the brake pedal 58. The wheel pressure at the non-driven wheels 15 and 16 is still applied. Prior to locking brake pressure at the non-driven wheels 15 and 16 a short system delay may be used to reduce pressure in the low pressure accumulator 34.

If brake pressure is applied to the non-driven wheels 15 and 16 by a separate action from initiating wheel hold mode 56 a second set of system checks may be performed by the ECU 50. The second set of system checks may include the same or different checks from before. For example, the second set of system checks may include, but are not limited to: vehicle speed below a predetermined threshold, steering wheel angle/offset below a threshold/position confirmed, confirmation that the doors are closed, confirmation that the driver seat belt is engaged, confirmation the of current brake pressure, confirm a parking brake is not engaged. In addition, even if the same system check, e.g. vehicle speed check, is performed prior to initiation of wheel hold mode 56 and prior to applying and locking brake pressure the threshold value by be different between the first and second system check.

The release of brake pressure of the wheels 15 and 16, step 68, is triggered by a separate event. Release of the brake pressure on the non-driven wheels, step 68, may be triggered automatically or by driver actuated release. Therefore, the EBS 10 may have an additional actuation/release switch 59. The actuation/release switch 59 may be the same or a separate switch from the actuation switch 59. The actuation/release switch 59 may also be mechanical or electrically operated switch located in a convenient location to the driver. For example, the actuation/release switch 59 may be located on the vehicle dashboard, on the steering wheel, or on a gear shifter. The actuation/release switch 59 may be use to apply and/or release the brake The driver actuates pressure to be applied at the non-driven axle wheels 15 and 16, step 64, and if necessary releases pressure at the driven axle wheels 17 and 18, step 66. For example, as the driver depresses the brake pedal 58 pressure is accumulated at the wheels 15 and 16 of the vehicle. To maintain the pressure at the non-driven wheels the appropriate valves 20, 27 and 40 in the electronic brake system (EBS) shall change states as to maintain hydraulic pressure at the desired wheels 15 and 16, e.g. normally open valve 20 may be closed and held closed. If pressure is applied through a driver actuated event, such as applying the brake pedal 58, the EBS maintains the pressure at the desired wheels 15 and 16 even after the event has ended, the driver releases the brake. In this manner, the wheels pressure at the non-driven wheels 15 and 16 continues to be applied without requiring the driver to apply the brake pedal. For vehicles with mechanical transmissions the driver needs both feet to apply the brakes and the clutch. However, with the brake system continuing to apply pressure the driver is then free to use the gas pedal.

The pressure may be maintained at the wheels 15 and 16 until the driver instructs the pressure to release or may be ended automatically by the ECU 50, step 68. For example, the pressure may be maintained by depressing a switch 59 and released by removing pressure from the switch 59. The pressure switch 59 may be located, for example, on a steering wheel 61 or a gear shifter, 60. The pressure switch 59 may be connected to the ECU 50. When the driver commands zero brake pressure the valves shall again change states as to allow the pressure at the wheels 15 and 16 of the vehicle to return to zero. The pump 35 may or may not aid to evacuate the fluid and thereby the pressure in the brake lines 22, 29, 33.

While brake pressure is being applied a third set of system checks may be ongoing. Any of the system events alone or in combination may automatically cause the release trigger. The third set of ongoing system checks which may automatically activate the release trigger is any of the conditions are met may be including, but not limited to: the vehicle reaching a predetermined vehicle speed threshold, e.g. vehicle speed is 2 mph, gravitational sensors detecting the vehicle at a predetermined gravitational threshold (e.g. yaw rate), time out since applying brake pressure, driver releasing a pressure switch, driver re-actuating a wheel hold switch, vehicle door opens, etc.

Valves 20 and 27 shall remain closed and maintain brake pressure at the wheels 15 and 16 until the driver gives the command to release the pressure. Once the driver gives the command to release brake pressure, valves 21 and 28 shall change states to open thereby relieving the brake pressure at the wheels 15 and 16. Valves 20 and 27 shall return to their original states of open. The pump 35 and motor 37 may or may not activate to increase the speed in which the brake pressure is relieved. If the command to release is given automatically the ECU 50 may ramp out the system applied pressure to a driver brake pressure or the brake pressure prior to wheel hold mode 56 brake pressure being applied. Additionally, the ECU 50 may also request an increased engine torque to prevent the vehicle 11 from stalling.

The line lock feature/wheel hold mode 56 may be used by vehicle 11 with either automatic or manual transmissions. Different threshold values from the various system checks, applied brake pressures, requested engine torques, etc. may differ for automatic and manual transmissions, and from one vehicle 11 configuration to another. This invention provides a means by which the driver can command brake pressure to be held at certain wheels 15 and 16 of the vehicle 11 without requiring continued application of the brake pedal 58. For vehicles with mechanical transmissions the driver needs both feet to apply the brakes and the clutch. However, with the brake system continuing to apply pressure the driver is then free to use the gas pedal. The brake pressure shall be held at the wheels 15 and 16 of the vehicle 11 until the driver commands zero brake pressure.

In addition, by maintaining brake pressure at the front wheels 15 and 16 of the vehicle, the rear wheels 17 and 18 are allowed to over spin thereby heating the tires to operating temperature. The brake pressure in the front wheels 15 and 16 will keep the vehicle 11 stationary during this exercise. Without this device the driver must manage brake, throttle, and clutch pedal inputs simultaneously.

Also note that the description herein is one example of the execution of this invention as such other parts of the brake system 10 may or may not be utilized to provide the desired performance from this invention, i.e. maintaining brake pressure at the rear wheels 17 and 18 or all four wheels 15, 16, 17, and 18.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of operating a brake system comprising:
providing a hydraulic dual-circuit brake control that includes a master brake cylinder with a brake pedal that communicates with the master brake cylinder, at least one pump for generating brake fluid pressure in the hydraulic pressure in the hydraulic dual-circuit brake control, at least one non-driven wheel brake with an inlet valve disposed in an inlet line having a spring-actuated open position and an electromagnetically switchable blocking position;
providing an outlet valve with a spring actuated blocking position and an electromagnetically switchable open position, wherein the outlet valve is located in a return line leading back to the at least one pump;
providing a shut-off valve connected between the pump, brake master cylinder, and the inlet valve, wherein the shut-off valve also has a spring actuated open position and an electromagnetically switchable blocking position;
depressing the brake pedal and initiating a wheel hold mode in an ECU (Electronic Control Unit) for the brake system;
applying pressure to the at least one non-driven wheel brake;
accumulating pressure at the at least one non-driven wheel brake and maintaining the pressure by moving the inlet valve to the closed position, moving the shut-off valve to the blocking position that will modulate and maintain pressure buildup in the brake system downstream of the shut-off valve;
maintaining wheel brake pressure at the at least one non-driven wheel brake; independent of application of the brake pedal; and
releasing the wheel brake pressure at the at least one non-driven wheel brake when a release trigger event occurs, wherein the release trigger event is one of: an automatic trigger event and a driver actuated trigger event, wherein the step of releasing the wheel brake pressure includes actuating the outlet valve to move the outlet valve to the open position so that the accumulating pressure is reduced by moving the pressure through the return line.

2. The method of claim 1, wherein applying pressure to the at least one non-driven wheel brake is initiated by one of: building brake pressure at the wheels with a pump, depressing and releasing the brake pedal, depressing and releasing a mechanical switch, and depressing and holding a pressure switch.

3. The method of claim 1, wherein the movement of the inlet valve, the outlet valve and the shut-off valve is controlled by the ECU.

4. The method of claim 1, wherein the release trigger event is one of the following conditions of a vehicle: the vehicle reaching a predetermined vehicle speed threshold, a yaw sensor detecting the vehicle at a predetermined yaw threshold, time out since applying brake pressure, driver releasing a pressure switch, and driver actuating a wheel hold switch.

5. The method of claim 1, wherein the ECU ends the wheel hold mode once the wheel brake pressure has been released.

6. The method of claim 5, wherein the release trigger event may be also be used in combination with another release trigger event.

7. The method of claim 1, wherein a system check is performed prior to initiation of the wheel hold mode, wherein the at least one system check is at least one of the following conditions of a vehicle: vehicle speed below an initiation threshold, confirmation no faults are currently existing within the brake system, steering wheel angle threshold check, steering wheel offset position confirmed, drive mode of the vehicle confirmed, other active brake system functions are not currently engaged, confirmation the vehicle is running, confirmation the doors are closed, and confirmation a driver seat belt is engaged.

8. The method of claim 7, wherein a second system check is performed prior to applying brake pressure, wherein the second system check is at least one of: vehicle speed below a predetermined threshold, steering wheel angle threshold check, steering wheel offset position confirmed, confirmation that the doors are closed, confirmation that the driver seat belt is engaged, confirmation the of a current brake pressure, and confirmation a parking brake is not engaged.

9. The method of claim 8, wherein a third system check is performed to automatically end the wheel hold mode is any on the system check conditions are met, wherein the third system check is at least one of: vehicle reaching a predetermined vehicle speed threshold, gravitational sensors detecting the vehicle at a predetermined gravitational threshold, time out since applying brake pressure, and a vehicle door opens.

10. A brake system comprising:
a hydraulic dual-circuit brake control that includes at least one pump for generating brake fluid pressure in the hydraulic-dual circuit brake control, a master brake cylinder with a brake pedal communicating with the master brake cylinder;
a plurality of wheel brakes connected to the master cylinder to apply a brake pressure at each of a plurality of vehicle wheels, wherein the plurality of wheel brakes include at least one non-driven wheel brake;
an inlet valve disposed in an inlet line having a spring actuated open position and an electromagnetically switchable blocking position;
an outlet valve with a spring actuated blocking position and an electromagnetically switchable open position, wherein the outlet valve is located in a return line leading back to the at least one pump;
a shut-off valve also having a spring actuated open position and an electromagnetically switchable blocking position; and
an electronic control unit connected to the master cylinder to control pressure within the brake system the electronic control unit including instructions for:
initiating a wheel hold mode for the brake system;
applying pressure to the at least one non-driven wheel brake;
accumulating pressure at the at least one non-driven wheel brake and maintaining the pressure by moving the inlet valve to the blocking position, moving the shut-off valve to the blocking position that will modulate and maintain pressure buildup in the brake system downstream of the shut-off valve;
maintaining wheel brake pressure at the at least one non-driven wheel brake independent of application of the brake pedal; and
releasing the wheel brake pressure at the at least one non-driven wheel brake when a release trigger event occurs, wherein the release trigger event is one of: an automatic trigger event and a driver actuated trigger event, wherein the step of releasing the wheel brake pressure includes actuating the outlet valve to move the outlet valve to the open position so that the accumulating pressure is reduced by moving the pressure through the return line.

11. The brake system of claim 10, wherein the electronic control unit instruction for applying pressure to the at least one non-driven wheel brake is initiated by one of: building brake pressure at the wheels with a pump, depressing and releasing the brake pedal, depressing and releasing a mechanical switch, and depressing and holding a pressure switch.

12. The brake system of claim 10, wherein the release trigger event is one of the following conditions of a vehicle: the vehicle reaching a predetermined vehicle speed threshold, a yaw sensor detecting the vehicle at a predetermined yaw threshold, time out since applying brake pressure, driver releasing a pressure switch, and driver actuating a wheel hold switch.

13. The brake system of claim 12, wherein the release trigger event may be also be used in combination with another release trigger event.

14. The brake system of claim 10, wherein the electronic control unit further comprises instructions for ending the wheel hold mode once the wheel brake pressure has been released.

15. The brake system of claim 10, further comprising a switch to allow a driver to select the wheel hold mode for the brake system, and wherein the switch is one of a mechanical and an electrical switch.

16. The method of claim 10, wherein a system check is performed prior to initiation of the wheel hold mode, wherein the system check is at least one of the following conditions of a vehicle: vehicle speed below an initiation threshold, confirmation no faults are currently existing within the brake system, steering wheel angle threshold check, steering wheel offset position confirmed, drive mode of the vehicle confirmed, other active brake system functions are not currently engaged, confirmation the vehicle is running, confirmation the doors are closed, and confirmation a driver seat belt is engaged.

17. The method of claim 10, wherein a second system check is performed prior to applying brake pressure, wherein the second system check is at least one of the following conditions of a vehicle: vehicle speed below a predetermined threshold, steering wheel angle threshold check, steering wheel offset position confirmed, confirmation that the doors are closed, confirmation that a driver seat belt is engaged, confirmation of a current brake pressure, and confirmation a parking brake is not engaged.

18. The method of claim 10, wherein a third system check is performed to automatically end the wheel hold mode if any of the system check conditions are met, wherein the third system check is at least one of the following conditions of a vehicle: vehicle reaching a predetermined vehicle speed threshold, gravitational sensors detecting the vehicle at a predetermined gravitational threshold, time out since applying brake pressure, and a vehicle door opens.

* * * * *